United States Patent
Chishima

(10) Patent No.: US 7,974,059 B2
(45) Date of Patent: Jul. 5, 2011

(54) POWER SUPPLY APPARATUS, POWER SUPPLY APPARATUS CONTROL METHOD

(75) Inventor: Yuki Chishima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/887,934

(22) Filed: Sep. 22, 2010

(65) Prior Publication Data

US 2011/0013329 A1 Jan. 20, 2011

Related U.S. Application Data

(63) Continuation of application No. 12/123,099, filed on May 19, 2008, now Pat. No. 7,821,756.

(30) Foreign Application Priority Data

Jun. 5, 2007 (JP) ................... 2007-149643

(51) Int. Cl.
*H02H 3/08* (2006.01)
(52) U.S. Cl. ............... 361/93.7; 361/93.1; 361/93.9
(58) Field of Classification Search .............. None
See application file for complete search history.

(56) References Cited

U.S. PATENT DOCUMENTS

| | | | | |
|---|---|---|---|---|
| 5,225,751 A * | 7/1993 | Kusano et al. | ............... | 318/434 |
| 5,305,174 A * | 4/1994 | Morita et al. | ............... | 361/63 |
| 5,689,395 A * | 11/1997 | Duffy et al. | ............... | 361/93.6 |
| 6,359,796 B2 * | 3/2002 | Hartular et al. | ............... | 363/50 |
| 6,646,842 B2 * | 11/2003 | Pan et al. | ............... | 361/58 |
| 7,408,755 B1 * | 8/2008 | Ye et al. | ............... | 361/93.1 |
| 7,821,756 B2 * | 10/2010 | Chishima | ............... | 361/93.7 |

* cited by examiner

*Primary Examiner* — Jared J Fureman
*Assistant Examiner* — Terrence R Willoughby
(74) *Attorney, Agent, or Firm* — Cowan, Liebowitz & Latman, P.C.

(57) ABSTRACT

A power supply apparatus comprises a current limiting unit connected in series between a power source and a power supply circuit that limits output current of the power source; a first switch connected in series with the current limiting unit; a second switch connected in parallel with the current limiting unit; a resistor connected in series between the power source and the current limiting unit; an abnormal current detection unit, connected in parallel with the resistor, that detects the current flowing through the resistor and determines whether or not the detected current is abnormal; and a control unit that turns on the first switch if the abnormal current detection unit detects a current, and, thereafter, turns the second switch on if the detected current is not abnormal, and turns the first switch off if the detected current is abnormal.

14 Claims, 3 Drawing Sheets

POWER SUPPLY APPARATUS, POWER SUPPLY APPARATUS CONTROL METHOD

CROSS-REFERENCE TO RELATED APPLICATION

This application is a continuation of application Ser. No. 12/123,099, filed May 19, 2008 now U.S. Pat. No. 7,821,756, the entire disclosure of which is hereby incorporated by reference.

BACKGROUND OF THE INVENTION

1. Field of the Invention

The present invention relates to a power supply apparatus provided with a protection function for abnormal current of a circuit and a power supply apparatus control method.

2. Description of the Related Art

In the conventional art, such as the invention disclosed in Japanese Patent Laid-Open No. 07-288930, a technique is known in which, in a power supply circuit that supplies DC voltage power from a power supply circuit to a plurality of load circuits through separate power lines, a breaker element is provided on each power line. In this case, in a case in which a short occurs in the load circuits or in a DC-DC converter and an overcurrent flows through the power lines, a control circuit turns off the breaker element, enabling the current to be cut off without affecting other load circuits with a voltage fluctuation or the like.

Further, a conventional power supply circuit like that shown in FIG. 3 is also known. In FIG. 3, reference numeral 10 designates a power source such as a battery or the like, and 20 designates a DC-DC converter. DC voltage output from the DC-DC converter 20 is applied to load circuits 70 through 90 as DC power for operation. In addition, a current detection resistor 40 and a current limiting resistor 50 are connected in series between the power source 10 and the DC-DC converter 20.

Both ends of the current detection resistor 40 are connected to an abnormal current detection circuit 31 contained in a control block 30. In the control block 30 there is provided the abnormal current detection circuit 31 and a control circuit 32 to which is supplied the output of the abnormal current detection circuit 31. In addition, a breaker switch circuit 60 is provided in parallel with the current limiting resistor 50. The breaker switch circuit 60 is controlled by a control signal from the control circuit 32. The control signal from the control circuit 32 is supplied to the DC-DC converter 20, and is used to put the DC-DC converter 20 into a state of operation. The operating power of the control block 30 is supplied directly from the power source 10.

Assume that, in the conventional power supply protection circuit shown in FIG. 3 having the configuration described above, when the power source 10 is activated, that is, when the battery is installed, a short occurs either in the DC-DC converter 20 or in one of the load circuits 70 through 90. In that case, as a matter of course an abnormal current flows. In such a case in which an abnormal current flows when the power source 10 is activated, an abnormality is detected at the abnormal current detection circuit 31 connected across the current detection resistor 40. That abnormality is then reported to the control circuit 32, and the output from the control circuit 32 turns the breaker switch circuit 60 off. However, even when the breaker switch circuit 60 is off there is still the current limiting resistor 50, and some current continues to flow from the power source 10. As a result, in a case in which the current limiting resistor 50 heats unnecessarily, the power source 10 discharges unnecessarily, or the power source 10 is a secondary battery, there is a risk of deterioration in performance due to overcurrent.

In order to avoid the above-described disadvantage due to the current limiting resistor 50, the current limiting resistor 50 could be eliminated. If the current limiting resistor 50 is eliminated, then when the power source 10 is activated, when the DC-DC converter 20 or any of the load circuits connected downstream of the DC-DC converter 20 is shorted, the power source 10 terminal voltage drops, operating power for the control block 30 cannot be maintained, and a shorted state continues, and ultimately the role of a protection circuit cannot be fulfilled. Alternatively, it might be possible to increase the resistance of the current limiting resistor 50, but because the abnormal current detection circuit 31 requires a current of at least several hundred mA in order to detect an abnormal current, the current limiting resistor 50 resistance cannot be increased very much due to this problem of sensitivity.

SUMMARY OF THE INVENTION

The present invention has been made in consideration of the above situation, and has as its object to provide a power supply apparatus capable of avoiding the disadvantage of continued flow of abnormal current when the power source is turned on.

According to the present invention, the foregoing object is attained by providing a power supply apparatus comprising a power source that outputs DC voltage; a power supply circuit to which DC voltage output from the power source is applied and which supplies necessary DC voltage to a connected load; a current limiting unit connected in series between the power source and the power supply circuit that limits output current of the power source; a first switch circuit connected in series with the current limiting unit; a second switch circuit connected in parallel with the current limiting unit; a resistor connected in series between the power source and the current limiting unit; an abnormal current detection unit, connected in parallel with the resistor, that detects the output current from the power source flowing through the resistor and determines whether or not the detected output current is abnormal; and a control unit that turns on the first switch circuit in a case in which the abnormal current detection unit detects a current, and, after turning the first switch circuit on, turns the second switch circuit on in a case in which the abnormal current detection unit determines that the current is not abnormal, and in a case in which the abnormal current detection unit determines that the current is abnormal, turns the first switch circuit off.

According to the present invention, the foregoing object is also attained by providing a control method for a power supply apparatus comprising a power source that outputs DC voltage, a power supply circuit to which DC voltage output from the power source is applied and which supplies necessary DC voltage to a connected load, a current limiting unit connected in series between the power source and the power supply circuit that limits output current of the power source, a first switch circuit connected in series with the current limiting unit, a second switch circuit connected in parallel with the current limiting unit, a resistor connected in series between the power source and the current limiting unit, and an abnormal current detection unit, connected in parallel with the resistor, that detects the output current from the power source flowing through the resistor and determines whether or not the detected output current is abnormal, the control method comprising turning on the first switch circuit in a case in which the abnormal current detection unit detects a current, and, after turning the first switch circuit on, turning the second switch circuit on in a case in which the abnormal current detection unit determines that the current is not abnormal, and in a case in which the abnormal current detection unit determines that the current is abnormal, turning the first switch circuit off.

Further features of the present invention will become apparent from the following description of exemplary embodiments (with reference to the attached drawings).

DESCRIPTION OF THE EMBODIMENT

A preferred embodiment of the present invention will be described in detail in accordance with the accompanying drawings.

Figure 1:
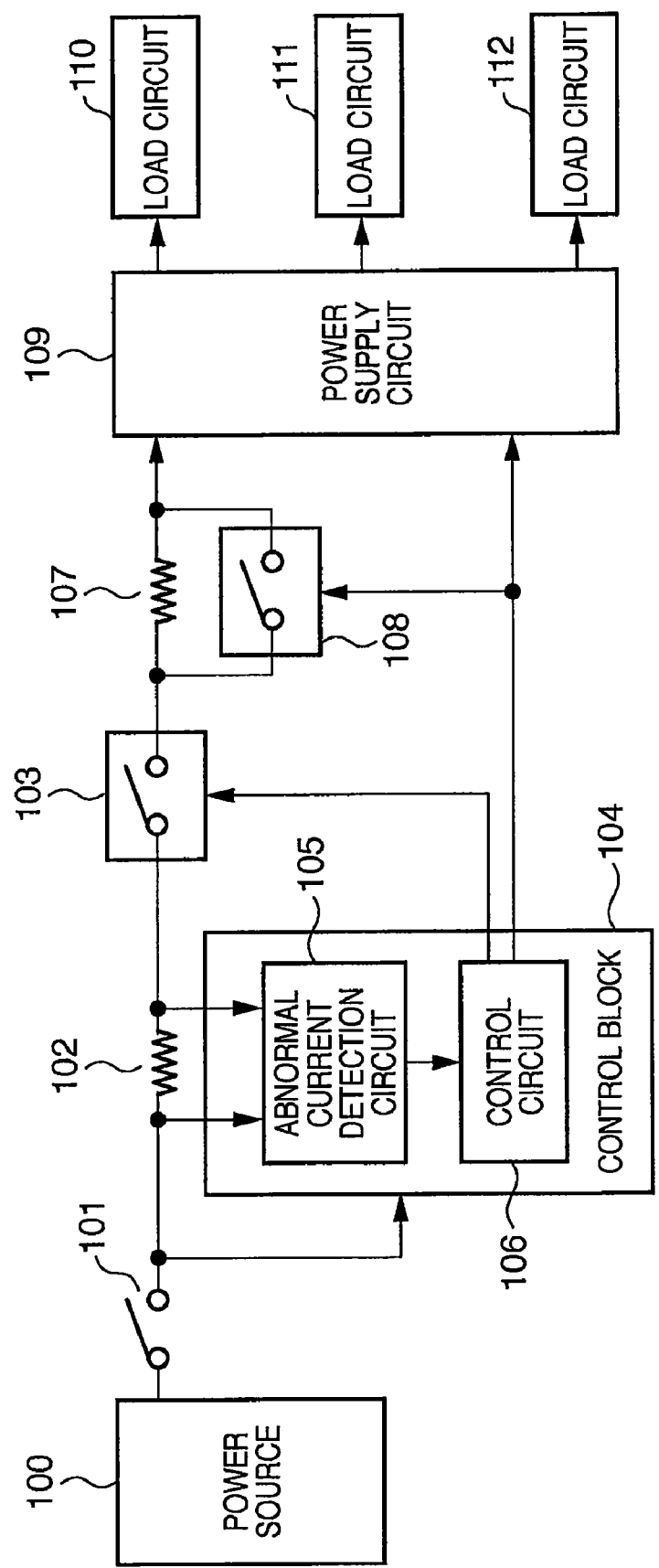
FIG. 1 is a block diagram illustrating essential elements of a power supply apparatus according to an embodiment of the present invention.
Figure 2:
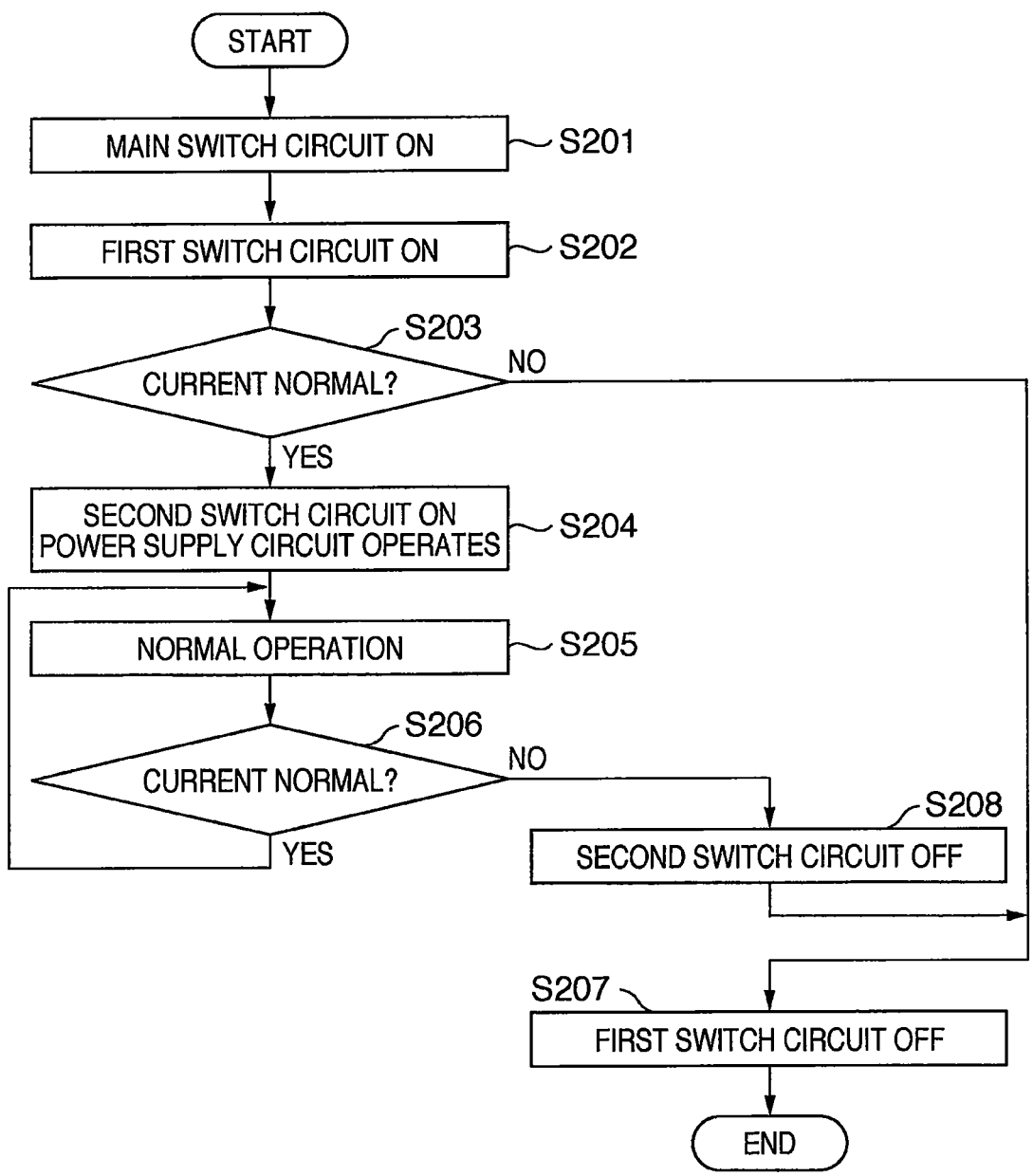
FIG. 2 is a flow chart illustrating operation of the power supply apparatus according to the embodiment of the present invention.
Figure 3:
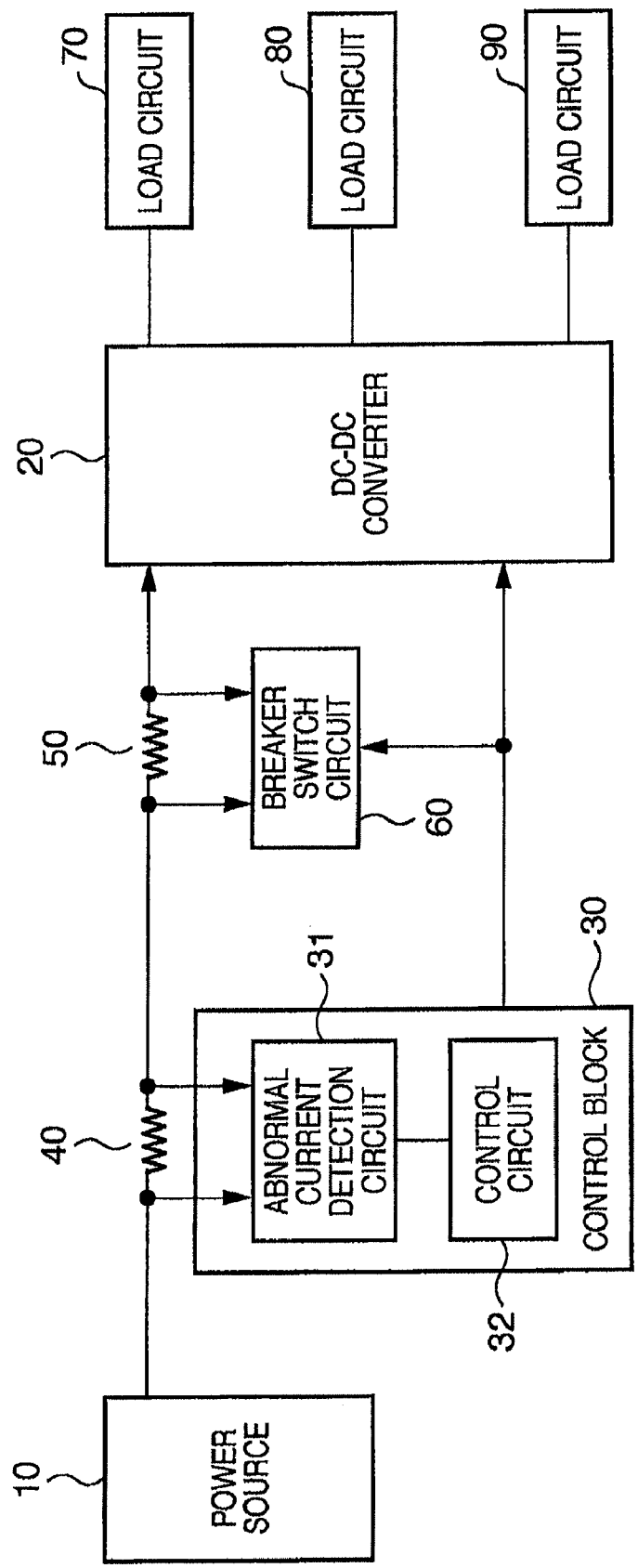
FIG. 3 is a block diagram showing a conventional power supply protection circuit.

A description is now given of a power supply apparatus according to an embodiment of the present invention, with reference to FIG. 1 and FIG. 2. FIG. 1 is a block diagram showing schematically one example of the essential elements of the power supply apparatus according to the embodiment of the present invention.

Reference numeral 100 designates a power source, composed of an ordinary battery, an AC adapter, or the like, and outputting DC voltage. A terminal for output of DC voltage from the power source 100 is connected to one terminal of a first switch circuit 103 via terminals of a series circuit consisting of a main switch circuit 101 and a current detection resistor 102. It should be noted that the main switch circuit 101 is not absolutely necessary. For example, the main switch circuit 101 can be eliminated by employing a configuration in which voltage is applied to the current detection resistor 102 and to a control block 104 when the battery is installed.

Next, an abnormal current detection circuit 105 is provided in relation to the current detection resistor 102. Specifically, both terminals of the current detection resistor 102 are connected to one terminal of the abnormal current detection circuit 105 contained in the control block 104, and an abnormal current detection signal is input to a control circuit 106 included in the same control block 104 when there is an abnormal current indicating abnormal operation. The operating power of the control block 104 is supplied from a connecting node between the terminals of the main switch circuit 101 and the current detection resistor 102. Further, the other terminal of the first switch circuit 103 is connected to a power supply circuit 109 via one terminal of a current limiting resistor 107.

The power supply circuit 109 is composed, for example, of a DC-DC converter, and inputs to a plurality of load circuits 110, 111, and 112 DC voltage necessary to operate the load circuits 110, 111, and 112 according to their specifications. It should be noted that a second switch circuit 108 is connected in parallel to the current limiting resistor 107 which, together with the first switch circuit 103, constitutes a series circuit.

The abnormal current detection circuit 105 monitors the voltage across the current detection resistor 102 and computes the value of the current flowing therethrough. In a case in which a current of a value at or above a predetermined threshold value flows through the current detection resistor 102, the abnormal current detection circuit 105 identifies an abnormal operation in which abnormal current has flowed and outputs an abnormal current detection signal to the control circuit 106. The current detection resistor 102 basically is positioned directly after the power source 100, and therefore is configured to be able to monitor the circuit overall current value.

The control circuit 106, depending on the abnormal current detection circuit 105 detection results, turns the first switch circuit 103 and the second switch circuit 108 on/off. In addition, the control signal from the control circuit 106 is further supplied to the power supply circuit 109 as well, by which the operation of the power supply circuit 109 is controlled.

Specifically, between the power source 100 and the power supply circuit 109, the current detection resistor 102, the first switch circuit 103, and the current limiting resistor 107 connected in parallel with the second switch circuit 108, are connected in series in that order.

To summarize, the first switch circuit 103 is positioned immediately after the current detection resistor 102 for the purpose of cutting off the circuit as a whole. In an initial state, the first switch circuit 103 and the second switch circuit 108 are off.

Subsequently, when the main switch circuit 101 is turned on or when a battery is installed, with a signal from the control circuit 106 the first switch circuit 103 is turned on. In addition, in a case in which the detection result of the abnormal current detection circuit 105 indicates that an abnormal current is flowing and an abnormal current detection signal has been output as an abnormal operation, a signal from the control circuit 106 turns the first switch circuit 103 off.

Moreover, the second switch circuit 108 is connected in parallel with the current limiting resistor 107 on the power line that connects the first switch circuit 103 and the power supply circuit 109. When the first switch circuit 103 is turned on or the battery is installed, the second switch circuit 108 is turned off. Therefore, until the second switch circuit 108 is turned on by a signal from the control circuit 106, DC voltage to the power supply circuit 109 is supplied through the current limiting resistor 107.

The current limiting resistor 107, in a case in which the power supply circuit 109 or any one of the load circuits 110 through 112 experiences a short, functions to limit output current and at the same time secure operating voltage for the control block 104, such as the abnormal current detection circuit 105 and the control circuit 106.

In a case in which the detection results of the abnormal current detection circuit 105 indicate that the current is within a normal range, the second switch circuit 108 is turned on by a control signal from the control circuit 106. Further, as the power supply circuit 109 is put into a state of operation as well, the supply of DC voltage to the power supply circuit 109 in a case in which the power supply apparatus is operating normally actually bypasses the current limiting resistor 107. Therefore, it is possible to prevent loss due to the current limiting resistor 107.

It should be noted that, alternatively, the first switch circuit 103 may be inserted between the power supply circuit 109 and the parallel circuit consisting of the current limiting resistor 107 and the second switch circuit 108.

FIG. 2 is a flow chart illustrating operation of the power supply apparatus according to the embodiment of the present invention. In FIG. 2, after the start of processing, the main switch circuit 101, the first switch circuit 103, and the second switch circuit 108 are off. Thereafter, first, in step S201, the main switch circuit 101 is turned on or the battery is installed. When that happens, operation proceeds to step S202, where, when a flow of current through the current detection resistor 102 is detected by the abnormal current detection circuit 105, the first switch circuit 103 is turned on by the control circuit 106 and operation proceeds to step S203.

Next, in step S203, the value of the current flowing through the current detection resistor 102 is determined by the abnormal current detection circuit 105. If the abnormal current detection circuit 105 determines that the current is normal, operation proceeds to step S204. If the abnormal current detection circuit 105 determines that the current is abnormal (abnormal operation), an abnormal current detection signal is output and operation proceeds to step S207.

In step S207, because operation is abnormal, the first switch circuit 103 is turned off, the supply of power to the power supply circuit 109 is cut off, and operation is ended.

Step S204 is executed in a case in which the current is found to be within a normal range by the abnormal current detection circuit 105 in step S203. The second switch circuit 108 is turned on by the control circuit 106, and at the same time the power supply circuit 109 is put into a state of operation, as a result of which, as shown in step S205, the apparatus operates normally.

Accordingly, during normal operation the second switch circuit 108 is turned on, thereby enabling unnecessary consumption of power by the current limiting resistor 107 to be avoided. In normal operation, in step S206 the value of the current at the current detection resistor 102 is constantly being monitored for abnormality. Then, in a case in which in step S206 the abnormal current detection circuit 105 determines that the value of the current at the current detection resistor 102 shows an abnormal operation (is outside normal range), operation proceeds to step S208.

In step S208, first, the second switch circuit 108 is turned off by the control circuit 106. Then, operation proceeds to step S207, at which the first switch circuit 103 is turned off by the control circuit 106 and operation is ended.

In other words, in step S206 also, as in step S203, the abnormal current detection circuit 105 checks the value of the current flowing through the current detection resistor 102. When the current is found to be within normal range, operation proceeds to step S205 and normal operation is maintained. When an abnormal current is found to be flowing, an abnormal current detection signal is output and operation proceeds to step 8S08.

It should be noted that it is possible to use a switch element that uses a mechanical solenoid or a FET or other such semiconductor switch element as the first switch circuit 103 and the second switch circuit 108.

As described above, according to the power supply apparatus according to the embodiment of the present invention, when power is turned on and there is a short in the power supply circuit or the load circuit, until the first switch circuit 103 is turned off current continues to flow through the current limiting resistor 102, and therefore during this interval operating power for the control block 104 can be secured. Thereafter, the first switch circuit 103 is turned off, enabling unnecessary heating of the current limiting resistor 107 and unnecessary discharge of the power source 100. Further, when the power source 100 is a secondary battery, the ability to avoid degradation due to overcurrent can be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-149643, filed on Jun. 5, 2007, which is hereby incorporated by reference herein in its entirety.

What is claimed is:

1. A power supply apparatus comprising:
    a power supply circuit that supplies DC voltage to a load;
    a current limiting unit that is connected in series between a power source and the power supply circuit, and limits output current flowing from the power source to the power supply circuit;
    a first switch circuit that is connected in series between the power source and the current limiting unit;
    a second switch circuit that is connected in parallel with the current limiting unit;
    a resistor that is connected in series between the power source and the first switch circuit;
    an abnormal current detection unit that is connected in parallel with the resistor, detects the output current using the resistor, and determines whether or not the output current is abnormal; and
    a control unit that turns on the first switch circuit so as to cause the abnormal current detection unit to determine whether or not the output current is abnormal if the first switch circuit and the second switch circuit are off,
    wherein the control unit turns on the second switch circuit if the abnormal current detection unit determines that the output current is not abnormal after the first switch circuit is turned on,
    the control unit turns off the first switch circuit without turning on the second switch circuit if the abnormal current detection unit determines that the output current is abnormal after the first switch circuit is turned on, and
    the control unit turns off the first switch circuit if the first switch circuit and the second switch circuit are on and the abnormal current detection unit determines that the output current is abnormal.

2. The power supply apparatus according to claim 1, wherein DC voltage is supplied from the power source to the control unit and the abnormal current detection unit.

3. The power supply apparatus according to claim 1, wherein the power supply circuit can operate normally as the output current flows from the power source to the power supply circuit through the second switch circuit, if the second switch circuit is turned on.

4. The power supply apparatus according to claim 1, wherein the control unit turns off the second switch circuit if the first switch circuit and the second switch circuit are on and the abnormal current detection unit determines that the output current is abnormal.

5. The power supply apparatus according to claim 1, wherein the first switch circuit includes an FET element and the second switch circuit includes an FET element.

6. The power supply apparatus according to claim 1, wherein the power supply circuit includes a DC-DC converter.

7. The power supply apparatus according to claim 1, wherein the power source is a battery.

8. A control method for a power supply apparatus, wherein the power supply apparatus includes: a power supply circuit that supplies DC voltage to a load; a current limiting unit that is connected in series between a power source and the power supply circuit, and limits output current flowing from the power source to the power supply circuit; a first switch circuit that is connected in series between the power source and the current limiting unit; a second switch circuit that is connected in parallel with the current limiting unit; a resistor that is connected in series between the power source and the first switch circuit; and an abnormal current detection unit that is connected in parallel with the resistor, detects the output current using the resistor, and determines whether or not the output current is abnormal, the control method comprising:

a step of turning on the first switch circuit so as to cause the abnormal current detection unit to determine whether or not the output current is abnormal if the first switch circuit and the second switch circuit are off;

a step of turning on the second switch circuit if the abnormal current detection unit determines that the output current is not abnormal after the first switch circuit is turned on;

a step of turning off the first switch circuit without turning on the second switch circuit if the abnormal current detection unit determines that the output current is abnormal after the first switch circuit is turned on; and a step of turning off the first switch circuit if the first switch circuit and the second switch circuit are on and the abnormal current detection unit determines that the output current is abnormal.

9. The control method according to claim 8, wherein DC voltage is supplied from the power source to the abnormal current detection unit.

10. The control method according to claim 8, wherein the power supply circuit can operate normally as the output current flows from the power source to the power supply circuit through the second switch circuit, if the second switch circuit is turned on.

11. The control method according to claim 8, further comprising:

a step of turning off the second switch circuit if the first switch circuit and the second switch circuit are on and the abnormal current detection unit determines that the output current is abnormal.

12. The control method according to claim 8, wherein the first switch circuit includes an FET element and the second switch circuit includes an FET element.

13. The control method according to claim 8, wherein the power supply circuit includes a DC-DC converter.

14. The control method according to claim 8, wherein the power source is a battery.

* * * * *